Aug. 7, 1962  H. H. MABRY  3,048,291
AUTOMOBILE BOAT CARRIER
Filed March 12, 1959  3 Sheets-Sheet 1

Harry H. Mabry
INVENTOR.

BY *Clarence A. O'Brien*
*and Harvey B. Jacobson*
Attorneys

Aug. 7, 1962  H. H. MABRY  3,048,291
AUTOMOBILE BOAT CARRIER
Filed March 12, 1959  3 Sheets-Sheet 2
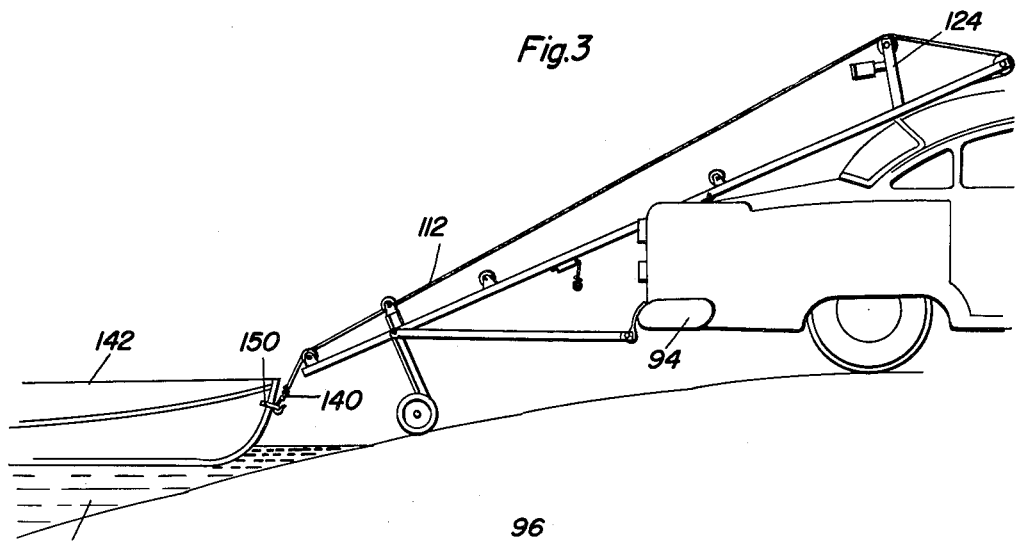
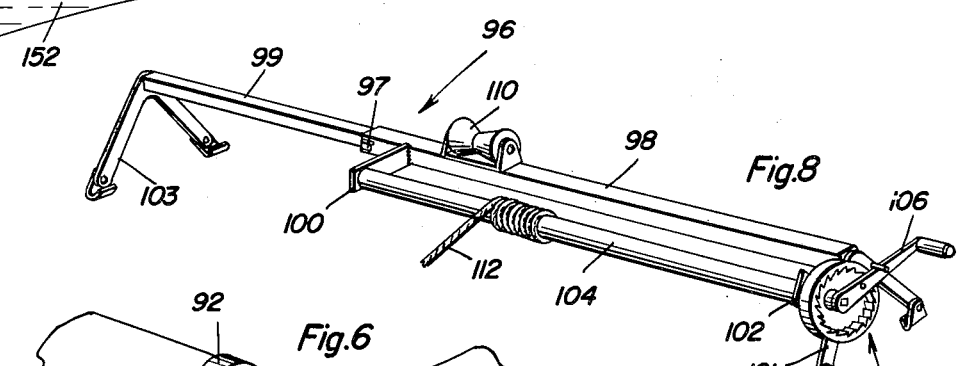
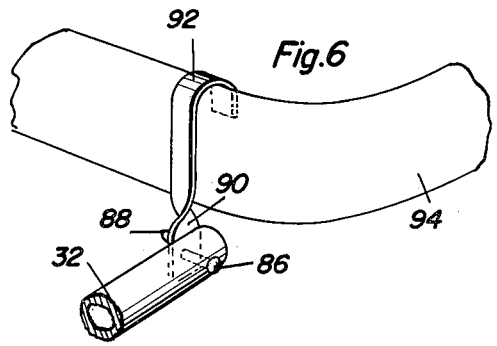
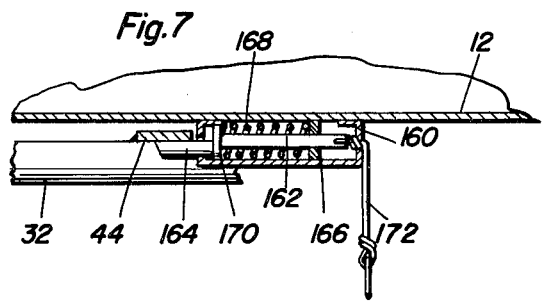
Harry H. Mabry
INVENTOR.

Aug. 7, 1962   H. H. MABRY   3,048,291
AUTOMOBILE BOAT CARRIER
Filed March 12, 1959   3 Sheets-Sheet 3
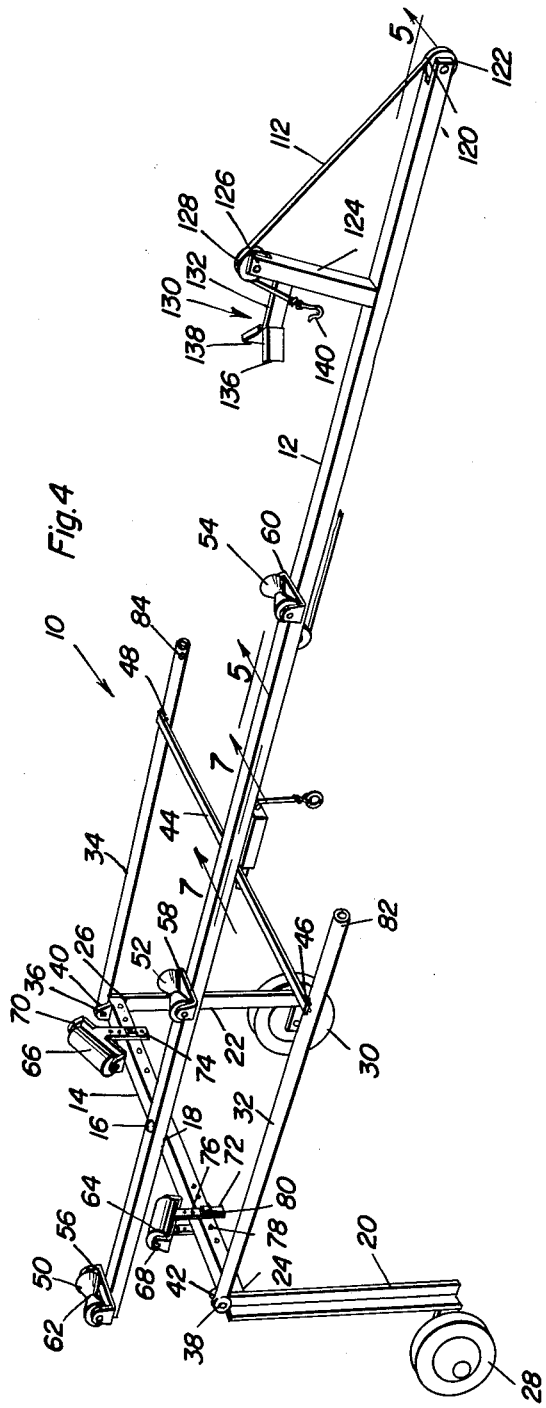
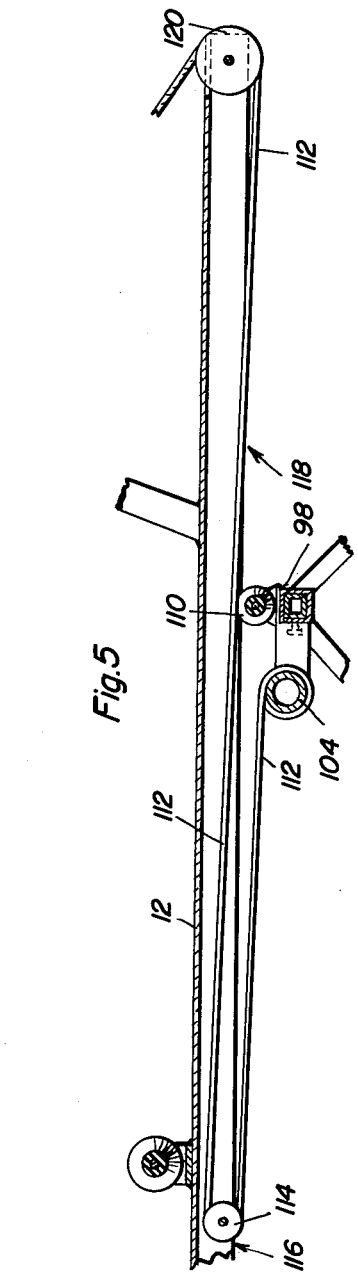
Harry H. Mabry
INVENTOR.

3,048,291
AUTOMOBILE BOAT CARRIER
Harry H. Mabry, 1104 N. 4th, Vandalia, Ill.
Filed Mar. 12, 1959, Ser. No. 798,868
8 Claims. (Cl. 214—450)

This invention relates generally to a load carrier and more particularly to an automobile load carrier particularly adapted for accommodating small boats.

Generally, in order to transport a boat, a boat owner will hitch a trailer to the back of his automobile and load the boat thereon. The utilization of trailers represents a cumbersome means of transporting a boat. Often, the utilization of trailers requires that driving speeds be kept at a minimum and extra precaution be taken so as to avoid accidents. Further, trailers generally require license plates and lights to comply with state regulations. Now that light aluminum boats are becoming increasingly more popular, it appears that conventional hard top automobiles are able to sustain the weight thereof. Accordingly, the invention hereinafter disclosed illustrates a novel and improved device which enables a boat, up to 16 feet, to be conveniently loaded on and carried by an automobile. The advantages of transporting a boat in this manner are of course obvious.

The principal object of this invention is to provide a novel automobile attachment for enabling small boats to be loaded thereon and carried thereby.

It is a further object of this invention to provide a novel boat carrier for automobiles which is simple in construction and operation such that one man may easily load the boat onto an automobile.

It is a further object of this invention to provide an automobile boat carrier which contemplates carrying the boat on top of the automobile but which may be easily converted to a trailer boat carrier.

It is a still further object of this invention to provide a novel device for enabling a boat to be carried by an automobile which is reliable and inexpensive to manufacture and install.

In accordance with the above stated objects, below is particularly described the construction and utilization of the automobile boat carrier comprising this invention. The carrier itself initially includes a hollow elongated member having a cross bar perpendicularly fixed thereto. A pair of legs having depending rotatable wheels are perpendicularly and terminally fixed to the cross bar. Further, a pair of arms are pivotally and terminally fixed to the cross bar and are in turn pivotally attached to the rear bumper of an automobile. A brace connects the arms. It will be seen, therefore, that the elongated member extends parallel to the longitudinal axis of the automobile. A winch is fixed to the automobile top and includes a crank and a cable having pawl and ratchet means operatively connected therebetween. The hollow elongated member includes a pulley rotatably fixed thereto adjacent an aperture in the member approximately midway between the ends thereof. A second aperture is positioned closer to the forward end of the member while a second pulley is terminally carried by the member. A standard extends upwardly from the member and rotatably terminally carries a pulley thereon. The cable forming part of the winch extends around the first pulley and through the first aperture in the member through the hollow portion of the member itself and out the second aperture and around the second and third pulleys. It will therefore be noted that if the cable is fixed to a boat and the boat be in the water with the automobile backed up thereto, the boat may be drawn up onto the member by drawing the cable by the crank. Further, it appears that it should be apparent that the first pulley adjacent the aperture will be drawn up to the winch whereby the hollow elongated member will be drawn on top of the automobile. The arms which are pivotally mounted relative to the rear bumper will assume a vertical position and are of such a length whereby the hollow elongated member extends parallel to the automobile top. Further structural features of the invention include rollers along the length of the elongated member. The rollers have a reduced central portion for accommodating the bottom of a boat. Further, a pair of angularly mounted rollers are supported on the cross bar for further supporting the boat. The rollers on the cross bar are adjustable therealong so as to allow the proper accommodation of various size boats. A further refinement includes a spring urged latch carried on the underside of the elongated member which is adapted to lie under the brace between the arms for retaining the brace adjacent to the member. A rigid structure is thereby formed and the device may then be utilized as a trailer.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a side elevational view of the boat released from the carrier into the water;

FIGURE 4 is a perspective view of the carrier detached from the automobile and assembled for use as a trailer;

FIGURE 5 is a sectional view taken substantially along the plane 5—5 of FIGURE 4;

FIGURE 6 is a perspective view of the attaching means between the pivotally supported arms and the rear bumper;

FIGURE 7 is a sectional view taken substantially along the plane 7—7 of FIGURE 4; and FIGURE 8 is a perspective view of the winch means.

Figure 1:
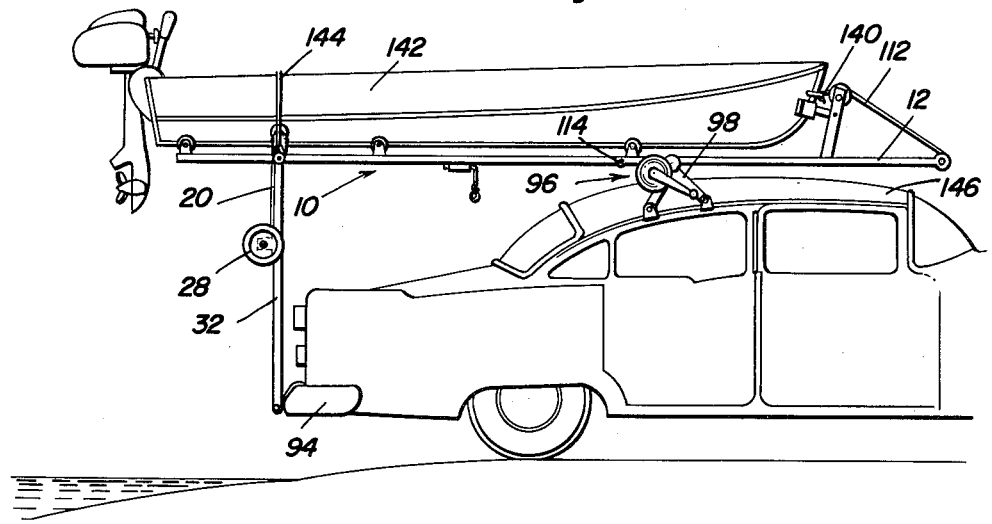
FIGURE 1 is a side elevational view of the boat carried by the automobile utilizing the carrier comprising this invention.

With continuing reference to the drawings and initial reference to FIGURE 4, the numeral 10 generally represents the boat carrier comprising this invention and including a hollow elongated member 12. A cross member 14 is bolted to the bar 12 by bolt 16 and may further be welded as at 18. A pair of angle irons 20 and 22 are perpendicularly and terminally fixed to the cross bar 14 as by welding at 24 and 26. Each of the angle irons 20 and 22 constituting depending legs, rotatably carries ground wheels 28 and 30. A pair of arms 32 and 34 have terminal apertures therein for accommodating stub shafts 36 and 38 which are received in ears 40 and 42 fixed to the cross bar 14. The stub shafts 36 and 38 allow the arms 32 and 34 to pivot relative to the cross bar 14. It will be apparent that the arms 32 and 34 are parallel to the member 12. A brace 44 is welded as at 46 and 48 between the arms 32 and 34 and it will be apparent that the member 12, bar 14 and wheeled legs 20 and 22 comprise a wheeled load supporting frame.

A plurality of rollers as at 50, 52 and 54 are rotatably retained in U-shaped frames 56, 58 and 60 respectively. The bight portions of the U-shaped frames are fixed to the top of the elongated member as by welding. It is to be particularly noted that each of the rollers 50, 52 and 54 includes a reduced central portion as at 62 for purposes which will be more apparent hereinafter. Rollers 64 and 66 are rotatably retained in U-shaped frames 68 and 70 which are in turn angularly supported by pairs of depending projections 72 and 74. As is clearly illustrated in FIGURE 4, the pair of depending projections, as for example 72, have a plurality of aligned apertures 76 which may be registered with apertures 78 in the cross bar so that the rollers 64 and 66 may be positioned along the length of the cross bar 14 and at varying distance thereabove. The aligned and registered apertures 76 and 78 receive a bolt 80 therethrough for retaining the rollers on the cross bar 14.

Still referring to FIGURE 4, now in conjunction with FIGURE 6, it is noted that apertures 82 and 84 terminally formed in the arms 32 and 34 receive screws 86 therethrough which are threadedly engaged with wing nuts 88. Accommodated therebetween is a flat portion 90 of a hook 92 adapted to overlie a rear bumper 94.

It will be noted that the arms 32 and 34 are therefore pivotable relative to the rear bumper 94.

Now referring to FIGURE 8, winch means 96 are illustrated including telescopingly related sections 98 and 99 having a set-screw 97 supported on inverted V-frames 101 and 103 respectively. Hooks 105 are attached to the V-frame 101 and 103 for cooperating with automobile top gutters for retaining the winch thereon. A pair of ears 100 and 102 are fixed to the section 98 and V-frame 101 respectively and rotatably support therebetween a spindle 104. A crank 106 is operatively connected to the spindle 104 for providing rotation thereto. A pawl and ratchet, generally designated as 108 is operatively connected between the crank 106 and 104 in a conventional manner for allowing the rotatable movement to be ratcheted. A roller 110 being of the same type as shown at 50, 52 and 54 is rotatably supported on the frame 98. A cable 112 has one end fixed to the spindle 104 so that the cable may be drawn around the spindle 104 by the motion of the crank 106.

Attention is now drawn to FIGURES 4, 5 and 8 wherein the connection between the winch means 96 and the carrier 10 will be noted. More particularly the cable 112 is illustrated as extending from the spindle 104 around a first pulley 114 supported in the hollow portion of the elongated member 12. An aperture 116 is provided adjacent the pulley 114 so that the cable 112 may extend therearound and into the hollow portion of elongated member 12. A second aperture 118 allows the cable 112 to emerge from the elongated member 12 and around a second pulley 120. It will be noted that the elongated member 12 has a bifurcated end portion 122 which rotatably supports the second pulley 120.

A standard 124 extends upwardly from the elongated member 120 and terminates in a bifurcated portion 126 rotatably supporting a third pulley 128 therebetween. The standard 124 further has extending therefrom a boat stop portion 130 including a rod 132 fixedly extending from the standard 124. The rod 132 supports wings 136 and 138 therefrom. The cable 112 extends around the second pulley 120 and around the third pulley 128. It is further contemplated that the cable 112 terminate in a hook 140.

Figure 2:
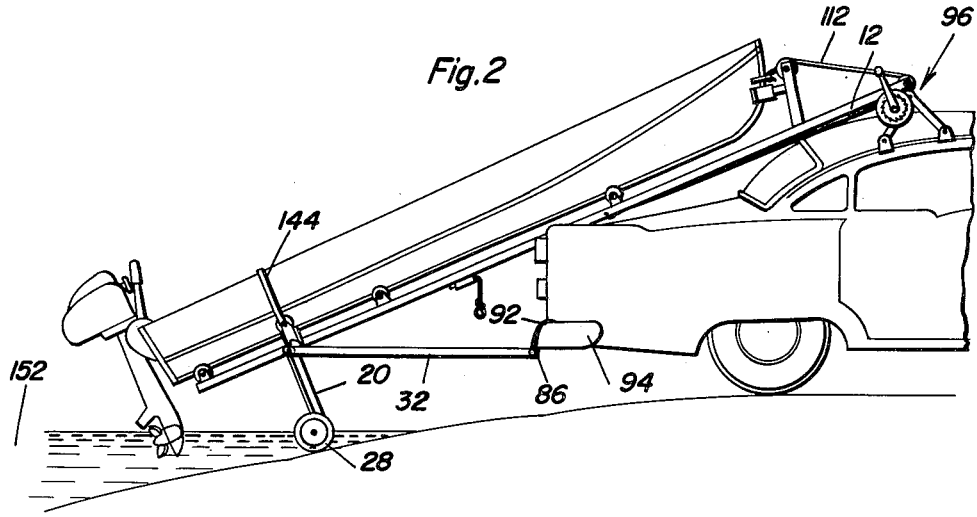
FIGURE 2 is a side elevational view of the boat being lowered from the automobile toward the water.

Now referring to the utilization of the device as illustrated in FIGURES 1 through 3, it is noted that the carrier 10 is supporting an outboard motor boat 142. A strap 144 may be utilized to securely fasten the boat 142 to the carrier 10. Particularly looking at the details of FIGURE 1 initially, it is noted that the winch means 96 are fixed to the top of an automobile 146. When the boat 142 is loaded on the top of the automobile 146 as indicated in FIGURE 1, the first pulley 114 mounted in member 12 is drawn proximate the winch means 96 by the cable 112. The bottom portion of the boat 142 rests in the reduced portion of the rollers 50, 52 and 54. The member 12 rests in the reduced portion of roller 110 secured to frame 98 of winch means 96. The hook 140 carried by the cable 112 is engaged with a hook 150 fixed to the boat 142. It will be noted that the arms 32 and 34 have assumed a vertical position relative to the bumper 94. Accordingly, they are perpendicular to the member 12 and parallel to the legs 20 and 22 supporting the wheels 28 and 30.

In order to place the boat 142 in the water 152, the winch means 96 slowly let out the cable 112 and the arms 32 and 34 will pivot about the screws 86 and hook 92 retained on bumper 94. The elongated member 12 will roll rearwardly on the roller 110 and of course the member 12 will angulate as indicated in FIGURE 2. The legs 20 and 22 carrying the ground wheels 28 and 30 will contact the ground as indicated in FIGURE 2. By slowly letting out the cable 112 and removing the retaining strap 144, the boat 142 will slide into the water 152 as indicated in FIGURE 3. The hook 140 carried by the cable 112 may then be released from the hook 150. Of course, in order to load the boat 142 on the automobile the reverse procedure is experienced.

It will be apparent therefore that a boat may be easily loaded and unloaded onto the top of an automobile simply by utilizing the crank of winch means supported on the automobile. The automatic features of the device are to be stressed. By simply backing the automobile up to the water, the winch means may be released and the cable let out so that the boat will automatically glide into the water. Experience has indicated that one man may easily operate the device. The ground wheels 28 and 30 properly fall into place as the winch is let out.

A further feature to be noted which enables the device to be utilized as a trailer whereby other equipment may be efficiently carried thereby, is the latch means illustrated in FIGURE 7. On the underside of the elongated member 12 is fixed an enclosed housing 160 having a rod 162 therein terminally carrying a tongue 164. A partition 166 is secured in the housing 160 and a concentric coil spring 168 is carried around the rod 162 between a flange 170 fixed to the rod 162 and the partition 166. A chain or such 172 is attached to the rod 162. Apparently therefore, the rod 162 may be moved in the housing 160 against the spring urging of spring 168. That is, the tongue 164 may be withdrawn into the housing 160. However, the tongue 164 is adapted to underlie the brace 44 fixed between the arms 32 and 34 to retain the brace 44 adjacent the elongated member 12. A rigid structure as indicated in FIGURE 4 is thereby formed which enables the device to be used as a trailer as such as indicated above.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with an automobile having a rear bumper, a load carrier particularly adapted for carrying small boats comprising a hollow elongated member, a cross bar perpendicularly fixed to said member, a pair of legs perpendicularly and terminally fixed to said cross bar and extending perpendicular to said member, a pair of arms pivotally and terminally fixed to said cross bar, a brace connected between said arms parallel to and spaced from said cross bar, said arms terminally and pivotally attached to said rear bumper, winch means supported on the roof of said automobile, said winch means including a crank and a cable adapted to be drawn by said crank, a pawl and ratchet operatively connected between said crank and said cable, means connecting said cable to said hollow elongated member whereby said hollow elongated member may be drawn onto said roof, said means including a first aperture defined in the surface of said member, a first pulley rotatably supported proximate said first aperture, a second aperture defined in the surface of said member, a second pulley rotatably and terminally supported on said member.

2. In combination with an automobile having a rear bumper, a load carrier particularly adapted for carrying small boats comprising a hollow elongated member, a cross bar perpendicularly fixed to said member, a pair of legs perpendicularly and terminally fixed to said cross bar and extending perpendicular to said member, a pair of arms pivotally and terminally fixed to said cross bar, a brace connected between said arms parallel to and spaced from said cross bar, said arms terminally and pivotally attached to said rear bumper, winch means supported on the roof of said automobile, said winch means including a crank and a cable adapted to be drawn by said crank, a pawl and ratchet operatively connected between said crank and said cable, means connecting said cable to said hollow elongated member whereby said hollow elongated member may be drawn onto said roof, said means including a first aperture defined in the surface of said member, a first pulley rotatably supported proximate said first aperture, a second aperture defined in the surface of said member, a second pulley rotatably and terminally supported on said member, a standard extending upwardly from said member, a third pulley rotatably terminally carried by said standard, said cable extending from said winch around said first pulley through said first aperture into said hollow member, out said second aperture and around said second and third pulleys.

3. In combination with an automobile having a rear bumper, a load carrier particularly adapted for carrying small boats comprising a hollow elongated member, a cross bar perpendicularly fixed to said member, a pair of legs perpendicularly and terminally fixed to said cross bar and extending perpendicular to said member, a pair of arms pivotally and terminally fixed to said cross bar, a brace connected between said arms parallel to and spaced from said cross bar, said arms terminally and pivotally attached to said rear bumper, winch means supported on the roof of said automobile, said winch means including a crank and a cable adapted to be drawn by said crank, a pawl and ratchet operatively connected between said crank and said cable, means connecting said cable to said hollow elongated member whereby said hollow elongated member may be drawn onto said roof, said means including a first aperture defined in the surface of said member, a first pulley rotatably supported proximate said first aperture, a second aperture defined in the surface of said member, a second pulley rotatably and terminally supported on said member, a standard extending upwardly from said member, a third pulley rotatably terminally carried by said standard, said cable extending from said winch around said first pulley through said first aperture into said hollow member, out said second aperture and around said second and third pulleys, said member rotatably carrying a plurality of rollers thereon, each of said rollers being tapered toward the center thereof for accommodating the bottom of a boat.

4. In combination with an automobile having a rear bumper, a load carrier particularly adapted for carrying small boats comprising a hollow elongated member, a cross bar perpendicularly fixed to said member, a pair of legs perpendicularly and terminally fixed to said cross bar and extending perpendicular to said member, a pair of arms pivotally and terminally fixed to said cross bar, a brace connected between said arms parallel to and spaced from said cross bar, said arms terminally and pivotally attached to said rear bumper, winch means supported on the roof of said automobile, said winch means including a crank and a cable adapted to be drawn by said crank, a pawl and ratchet operatively connected between said crank and said cable, means connecting said cable to said hollow elongated member whereby said hollow elongated member may be drawn onto said roof, said means including a first aperture defined in the surface of said member, a first pulley rotatably supported proximate said first aperture, a second aperture defined in the surface of said member, a second pulley rotatably and terminally supported on said member, a standard extending upwardly from said member, a third pulley rotatably terminally carried by said standard, said cable extending from said winch around said first pulley through said first aperture into said hollow member, out said second aperture and around said second and third pulleys, said member rotatably carrying a plurality of rollers thereon, each of said rollers being tapered toward the center thereof for accommodating the bottom of a boat, a roller angularly and rotatably supported on said cross bar on each end of said bar, each of said rollers on said cross bar being mounted for movement therealong.

5. In combination with an automobile having a rear bumper, a load carrier particularly adapted for carrying small boats comprising a hollow elongated member, a cross bar perpendicularly fixed to said member, a pair of legs perpendicularly and terminally fixed to said cross bar and extending perpendicular to said member, a pair of arms pivotally and terminally fixed to said cross bar, a brace connected between said arms parallel to and spaced from said cross bar, said arms terminally and pivotally attached to said rear bumper, winch means supported on the roof of said automobile, said winch means including a crank and a cable adapted to be drawn by said crank, a pawl and ratchet operatively connected between said crank and said cable, means connecting said cable to said hollow elongated member whereby said hollow elongated member may be drawn onto said roof, said means including a first aperture defined in the surface of said member, a first pulley rotatably supported proximate said first aperture, a second aperture defined in the surface of said member, a second pulley rotatably and terminally supported on said member, a standard extending upwardly from said member, a third pulley rotatably terminally carried by said standard, said cable extending from said winch around said first pulley through said first aperture into said hollow member, out said second aperture and around said second and third pulleys, said member rotatably carrying a plurality of rollers thereon, each of said rollers being tapered toward the center thereof for accommodating the bottom of a boat, a roller angularly and rotatably supported on said cross bar on each end of said bar, each of said rollers on said cross bar being mounted for movement therealong, wheels rotatably supported from said legs, releasable latch means carried by said member for retaining said brace adjacent thereto.

6. In combination with an automobile having a rear bumper, a load carrier particularly adapted for carrying small boats comprising an elongated longitudinally extending and horizontal supporting frame, a pair of depending transversely spaced legs fixedly supported from said supporting frame and each having a wheel journaled from its lower end portion for rotation about an axis extending transversely of said supporting frame, a pair of arms spaced transversely of said supporting frame and pivotally secured to said frame at corresponding end portions for rotation about transversely extending axes, brace means connected between said arms at points spaced from said corresponding end portions, the free ends of said arms being releasably and pivotally attached to said bumper for movement of said arms between raised positions substantially paralleling said supporting frame and lowered perpendicular positions with the free ends of said arms disposed lowermost, said legs including abutment means engageable with said arms to define said lowered positions.

7. The combination of claim 6 including winch means supported on the roof of said automobile, said winch means including a crank and a cable adapted to be drawn by said crank, a pawl and ratchet operatively connected between said crank and said cable, means connecting said cable to said elongated frame whereby said frame may be drawn onto said roof.

8. The combination of claim 6 wherein said support frame includes a plurality of supporting rollers thereon adapted to support a boat for movement longitudinally of said frame.

References Cited in the file of this patent

UNITED STATES PATENTS

| | | |
|---|---|---|
| 2,753,063 | Abel | July 3, 1956 |
| 2,776,769 | McDonald | Jan. 8, 1957 |
| 2,834,492 | Roy et al. | May 13, 1958 |
| 2,860,800 | Wilson et al. | Nov. 18, 1958 |
| 2,896,804 | Ingram | July 28, 1959 |
| 2,931,528 | Mabry | Apr. 5, 1960 |
| 2,982,431 | Moody | May 2, 1961 |